Jan. 2, 1945.  B. E. HOLBROOK  2,366,622
SEED HARVESTER
Filed Dec. 27, 1943  4 Sheets-Sheet 1
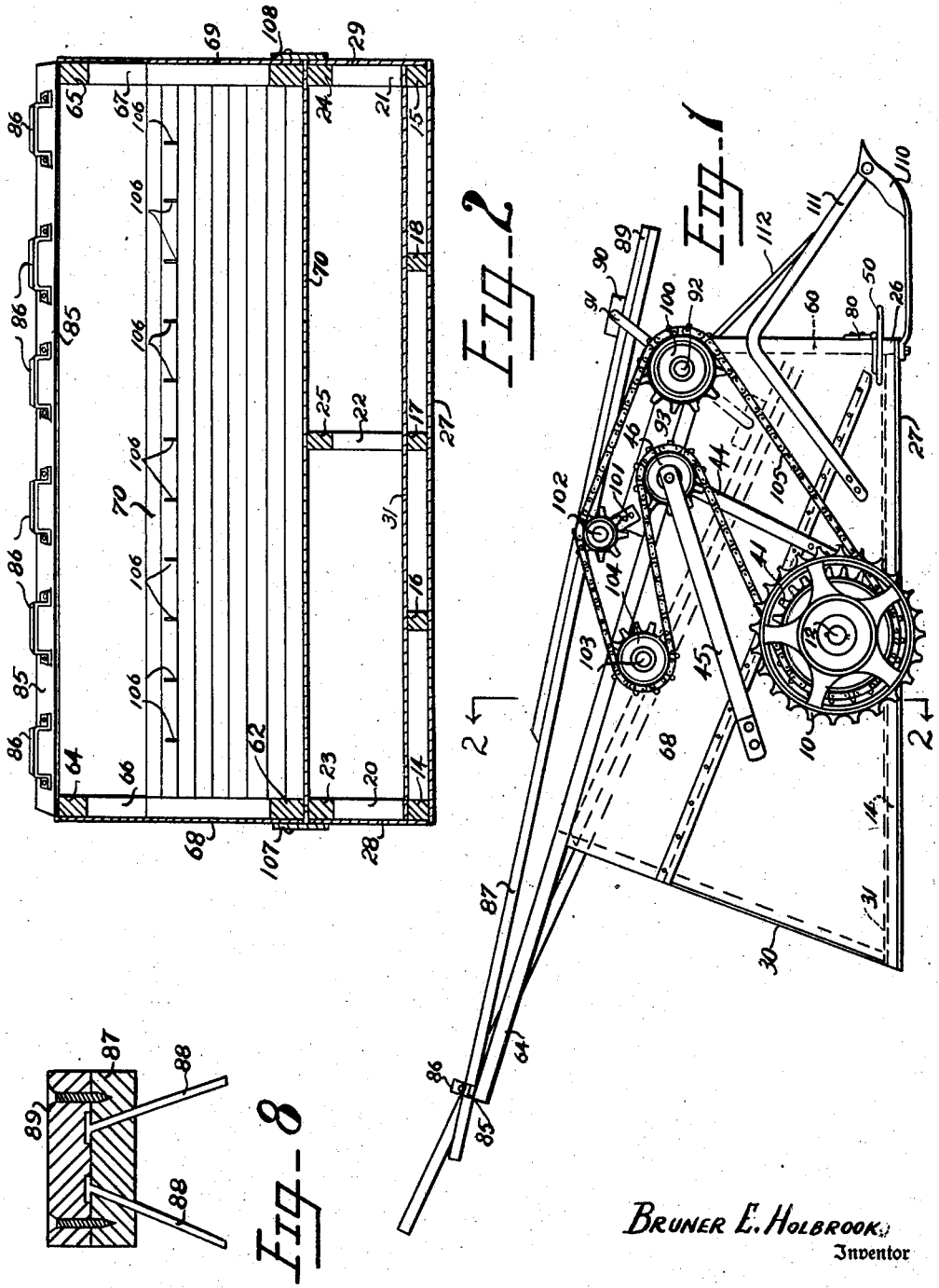
Bruner E. Holbrook,
Inventor
By
Attorney Jan. 2, 1945.  B. E. HOLBROOK  2,366,622
SEED HARVESTER
Filed Dec. 27, 1943   4 Sheets-Sheet 2
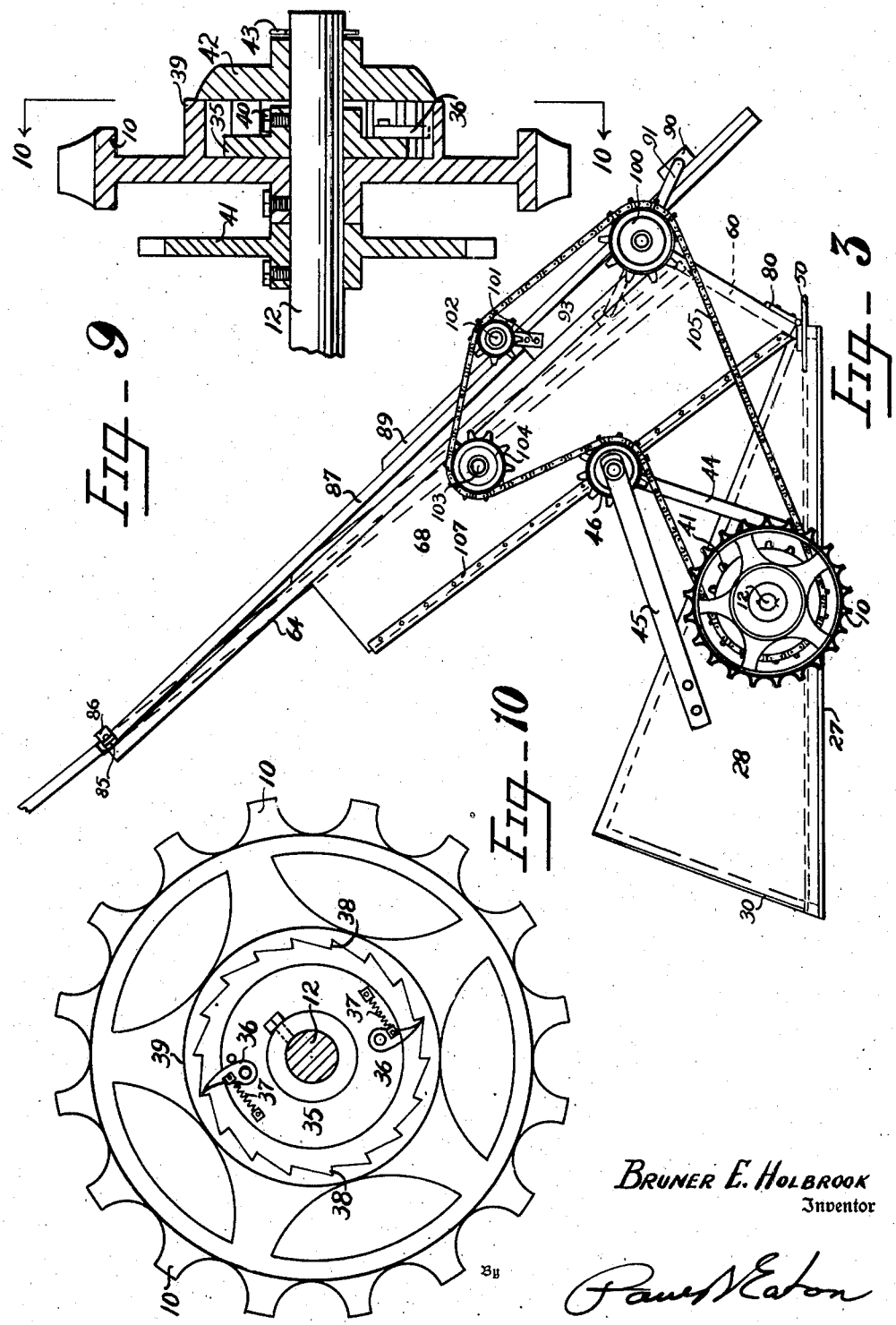
Bruner E. Holbrook
Inventor
By Paul N. Eaton
Attorney

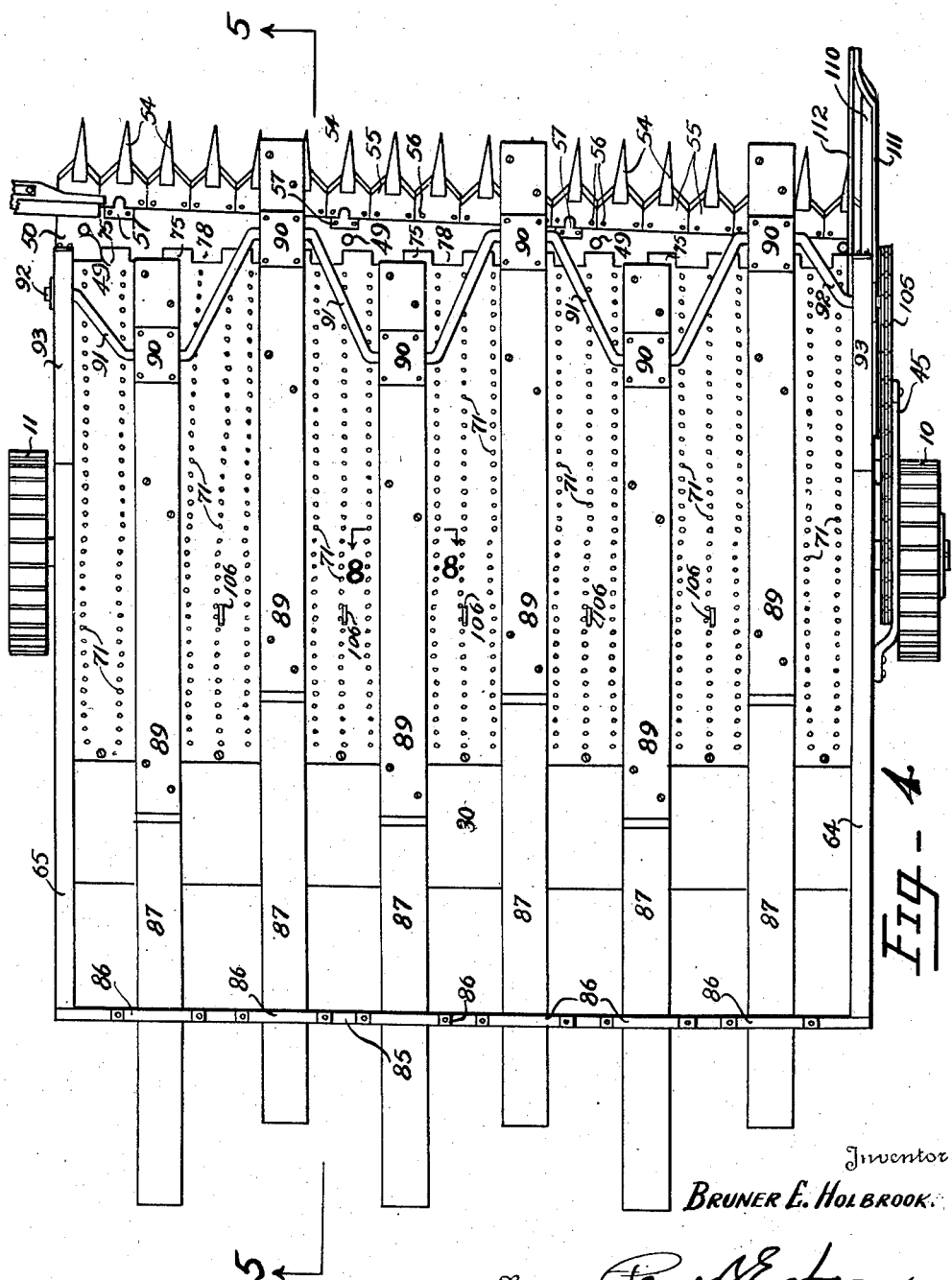

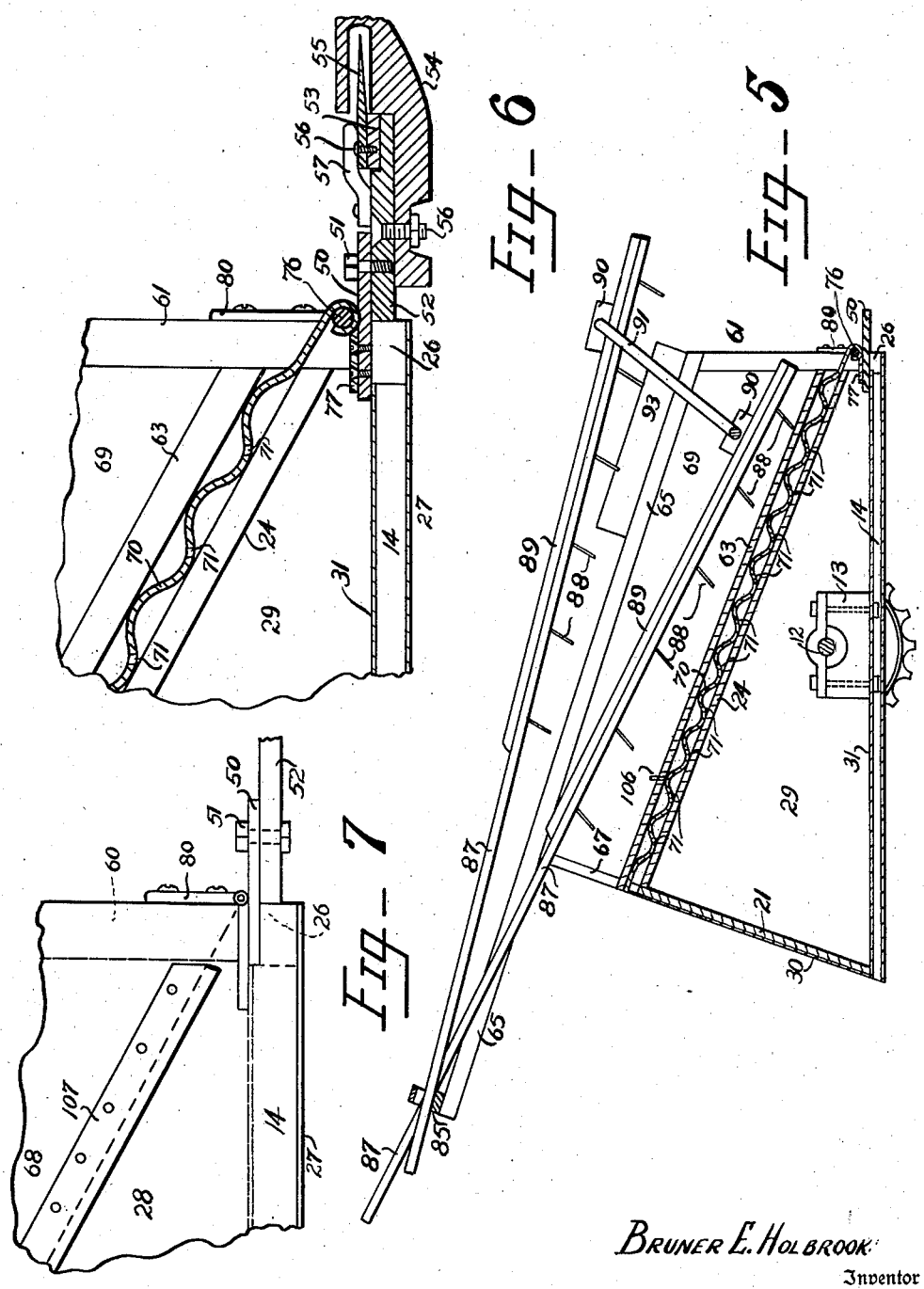
Jan. 2, 1945. B. E. HOLBROOK 2,366,622
SEED HARVESTER
Filed Dec. 27, 1943 4 Sheets-Sheet 4
Bruner E. Holbrook
Inventor Patented Jan. 2, 1945

2,366,622

UNITED STATES PATENT OFFICE 2,366,622

SEED HARVESTER

Bruner E. Holbrook, Stanfield, N. C.

Application December 27, 1943, Serial No. 515,762

2 Claims. (Cl. 56—207)

This invention relates to a seed harvester adapted to be attached to a conventional mowing machine, and is more especially related to a harvester having means for attaching the front end thereof to a sickle bar of a mowing machine, the harvester having wheels for supporting the same and for driving the feeding mechanism for feeding the cut vegetation backwardly over a perforated screen. The harvester is especially adapted for harvesting of seed from lespedeza, clover, and other seed crops.

This application is an improvement of the structure shown in my patent application, Serial Number 211,650, filed June 3, 1938, for Seed harvesting machine, and allowed on March 28, 1939, but which did not mature into a patent on account of my inadvertently failing to pay the final fee.

It is an object of this invention to provide a seed harvester adapted to be secured to the sickle bar of a mowing machine, and having a seed box covered with a perforated screen and having raking members for raking the cut vegetation rearwardly over the perforated screen, the raking members being driven by the ground wheels of the harvester, and the upper portion of the harvester being quickly tiltable upwardly to expose the seed box before the perforated screen so that the seeds can be easily and quickly removed therefrom.

It is another object of this invention to provide a seed harvester adapted to be attached to the sickle bar of a mowing machine, and having ground wheels for supporting the seed harvester, the harvester having means for propelling the cut vegetation rearwardly over a perforated screen, and said propelling means being driven by the ground wheel, and the upper part of the harvester being adapted to be lifted upwardly on a suitable pivot disposed at the front of the machine to expose the seed box to view, so that it becomes easily accessible for removing the harvested seeds from the seed box.

Some of the objects of the invention having been stated, other objects will appear as the description proceeds, when taken in connection with the accompanying drawings, in which—

Figure 1 is a side elevation of the apparatus;

Figure 2 is a transverse sectional view taken along the line 2—2 in Figure 1, and omitting the raking bars, and also omitting the ground wheels of the harvester;

Figure 3 is a side elevational view similar to Figure 1, but showing the top portion of the harvester in raised position, and omitting the deflectors 110, 111, and 112;

Figure 4 is a top plan view of the harvester;

Figure 5 is a longitudinal sectional view taken along the line 5—5 in Figure 4, omitting the sickle bar;

Figure 6 is an enlarged detail view of the lower right-hand portion of Figure 5, but showing in addition the sickle bar to which the apparatus is attached;

Figure 7 is an enlarged detail view of the lower right-hand corner of Figure 1, omitting the guards;

Figure 8 is a transverse sectional view taken along the line 8—8 in Figure 4;

Figure 9 is a vertical sectional view through the right-hand ground wheel taken longitudinally of the axle;

Figure 10 is a sectional view taken along the line 10—10 in Figure 9.

Referring more specifically to the drawings, the numerals 10 and 11 indicate ground wheels which are mounted on an axle 12 passing through the lower portion of the machine. The axle is mounted in any suitable manner in the side wall frameworks of the lower portion of the apparatus, such as by a split bearing 13 disposed on the longitudinal outside bottom frame pieces 14 of the seed box of the apparatus. The lower portion of the machine or seed box also has longitudinal frame members 16, 17, and 18 disposed intermediate the sides of the apparatus, and has uprising corner posts 20 and 21 with uprising center posts 22, and it also has forwardly sloping top frame members 23 and 24 at the sides thereof and a center longitudinally disposed frame member 25. These frame members project downwardly, and have their front ends resting on the transverse front frame member 26. A suitable protective bottom such as a piece of sheet metal 27 is secured on the bottom sides of the bottom frame members. Side wall members 28 and 29 and rear wall member 30 complete the seed box of the apparatus. A bottom such as a piece of sheet metal 31 is secured over the frame members 14, 16, 17, and 18. Both of the wheels are used for a driving wheel, and therefore, must have a special mounting on the axle. This mounting is shown in Figures 9 and 10 wherein a hub 35 is provided having a plurality of pivoted dogs 36 which are urged by a compression spring 37 to engage ratchet notches 38 disposed on the interior surface of annular hub member 39 of the wheels 10 and 11. The hub 35 is fixedly secured on axle 10 by any suitable means such as a set screw 40. A hub cap 42 is loosely secured on axle 12 by means such as a cotter pin 43. The axle 12 has fixedly secured thereto a sprocket wheel 41 and the side wall 28 has fixed on the exterior thereof arms 44 and 45 having a sprocket wheel 46 rotatably mounted in the free ends thereof.

Extending all the way across the front of the apparatus and secured preferably on top of front frame member 26 and extending over into and secured to the over-lapping end of side frame members 14 and 15 is a plate 50 having a plurality of holes 49 therein adapted to be penetrated by screws 51 which are threadably embedded in a conventional sickle bar 52 of a mowing machine, the sickle bar having a reciprocating knife bar 53 mounted therein and disposed in guards 54 and having knives 55 thereon, the guards being bolted as at 56 to the sickle bar, and suitable brackets 57 are provided for holding the reciprocating knife bar 53 in position. It is to be noted that plate 50 is somewhat broader at the side next to the mowing machine than at the other side, so as to cause the harvester to be attached to the sickle bar at a slight angle, so that due to the pull of the harvester on the sickle bar which has a tendency to pull the outer free end of the sickle bar backwardly somewhat, the harvester will run in a straight line.

The upper portion of the machine comprises front corner posts 60 and 61, lower side frame members 62 and 63, and upper side frame members 64 and 65, rear posts 66 and 67, and to each side of the upper framework, there are secured side plate members 68 and 69, and to the lower surface of lower side frame members 62 and 63, there is secured a corrugated metal plate 70 having holes 71 therein through which the seed removed from the lespedeza, clover, and the like fall into the seed box. This corrugated metal plate with holes therein can just as well be replaced by a screen wire bottom of suitable mesh, but I prefer the corrugated plate, because it is to be noted that the grooves tend to catch the seed, and the holes 71 are in the front lower portion of the grooves, thus facilitating the catching of the seed so they will fall through the holes. The front edge of the corrugated plate 70 has a plurality of cavities cut therein forming spaced tongues 75 which are curved around a rod 76, and a plate 77 is secured onto plate 50, and extends across the machine, and has a plurality of spaced tongues 78 also curved around the rod 76 to form a piano hinge on which the corrugated bottom and upper framework may pivot to be moved to the position shown in Figure 3 when access to the seed box is desired. The front side posts 60 and 61 have secured thereto one end of a hinge 80. The other end of the hinge is secured on top of plate 50 to form a hinge for the framework which is in alignment with the piano hinge formed around rod 76.

The two top bars 64 and 65 project rearwardly a substantial distance of the rear portion of the machine, and have a cross bar 85 secured thereacross on which a plurality of guide members 86 are provided for slidably receiving the rear end of the rake bars 87. These rake bars 87 have a plurality of downwardly, rearwardly, and outwardly diverging pins such as nails 88 therein which are confined in position by an additional bar 89 being secured on top of the rake bars 87. The front ends of these rake bars are pivotally secured by bearing blocks 90 to cranks 91 on crank shaft 92, which is rotatably confined in bearing blocks 93 on the top rails 64 and 65. The end of the crank arm member 92 nearest the observer in Figures 1, 3, and 4 has fixedly mounted thereon a sprocket wheel 100 and projecting upwardly from top bar 64 is a rigid arm 101 which has rotatably mounted thereon an idler sprocket 102 and secured on the side wall 68 is a suitable stub shaft 103 on which an idler sprocket 104 is rotatably mounted, and the sprocket chain 105 is mounted on sprocket wheels 41, 100, 102, 103, and 46 for imparting rotation to the crank shaft 92 and the arrangement of the sprocket wheels is such that the upper portion of the harvester can be pivoted upwardly as shown in Figure 3 without disturbing the overall length of the sprocket chain 105 as the sprocket wheels are so arranged that it will be held in proper position on all of its associated sprocket wheels whether it is in upper raised position or in operating position. The apparatus is raised to the position shown in Figure 3 which takes the corrugated bottom up with the top frame, so as to permit easy access to the interior of the lower framework where the seeds are deposited after falling through the holes 71 in the perforated screen 70. The perforated plate 70 has a plurality of upwardly and rearwardly directed prongs 106 which are for the purpose of somewhat retarding the vegetation being raked upwardly over the perforated plate 70 by the rake bars 87 to assist in threshing the seed from the vegetation and to prevent its too rapid ascent up the perforated screen.

The side walls 68 and 69 have secured thereto suitable plates 107 and 108 which are adapted to fit down over the exterior surface of the upper portion of the side walls 28 and 29 to form a seal between the upper and lower frames of the apparatus.

To the lower side of the front of the machine, there is secured a forwardly and upwardly projecting divider member 110 to the front end of which is secured deflector 111, these serving to divide and deflect the vegetation before it is cut by the sickle and to prevent its falling outwardly of the path to be travelled by the machine. Rod 112 has its rear end secured to the upper framework and projects downwardly and forwardly to assist in deflecting the vegetation inwardly.

In the drawings and specification, there has been set forth a preferred embodiment of the invention, and although specific terms are employed, they are used in a generic and descriptive sense only and not for purposes of limitation, the scope of the invention being defined in the claims.

I claim:

1. A seed harvester adapted to be secured to a sickle bar of a mowing machine comprising a wheeled frame having an axle with ground wheels thereon and having a plate at its front edge provided with holes through which bolts are adapted to pass to secure the same to the sickle bar of a mowing machine, the wheeled frame having an upwardly and downwardly sloping upper edge, an upper frame pivoted at its front lower portion to the lower frame at a point adjacent the sickle bar, the upper frame having a perforated bottom extending over the entire bottom of the upper frame, a crank shaft mounted transversely of the upper forward portion of the upper frame, and having a plurality of cranks thereon, a plurality of rake bars, there being one rake bar attached near its front end to each crank on the crank shaft, means slidably supporting the rear ends of the rake bars at the rear end of the upper frame, a sprocket wheel mounted on the crank shaft, a second sprocket wheel mounted on the axle, an idler sprocket mounted on the lower frame and an idler sprocket mounted on the upper frame rearwardly of the first idler sprocket, a sprocket chain mounted on all of the sprockets whereby the upper frame can be pivoted forwardly to uncover the top of the lower frame without the necessity of removing the sprocket chain.

2. A seed harvester adapted to be secured to a sickle bar of a mowing machine comprising a wheeled lower frame having an axle transversely and rotatably supported therein, a pair of ground wheels on the end of the axle for supporting the framework, the frame having its upper surface open and the upper edge of the sidewalls sloping forwardly to substantially merge with the bottom of the lower frame, a plate secured to the lower front portion of the frame, and having means for securing the same to the sickle bar of a mowing machine, an upper frame pivotally secured to the lower forward portion of the wheeled frame, and having a perforated bottom extending thereacross, the front edge of the bottom being pivotally secured to said plate, a crank shaft having a plurality of crank arms thereon, and being rotatably mounted in the upper forward portion of the upper frame, a plurality of rake bars pivotally mounted at their forward ends on the cranks of the crank shaft, means disposed transversely of the upper frame for slidably supporting the rear portion of the rake bars, the upper frame being capable of pivotal upward and forward movement to uncover the lower frame, and escapements between the ground wheels and the axle for driving the axle from the wheels, a driving connection between the axle and the crank shaft for imparting rotation to the crank shaft.

BRUNER E. HOLBROOK.